Feb. 17, 1942. G. CHARLTON 2,273,250
METHOD OF MAKING VALVE PARTS OR THE LIKE
Filed March 24, 1938 2 Sheets-Sheet 2

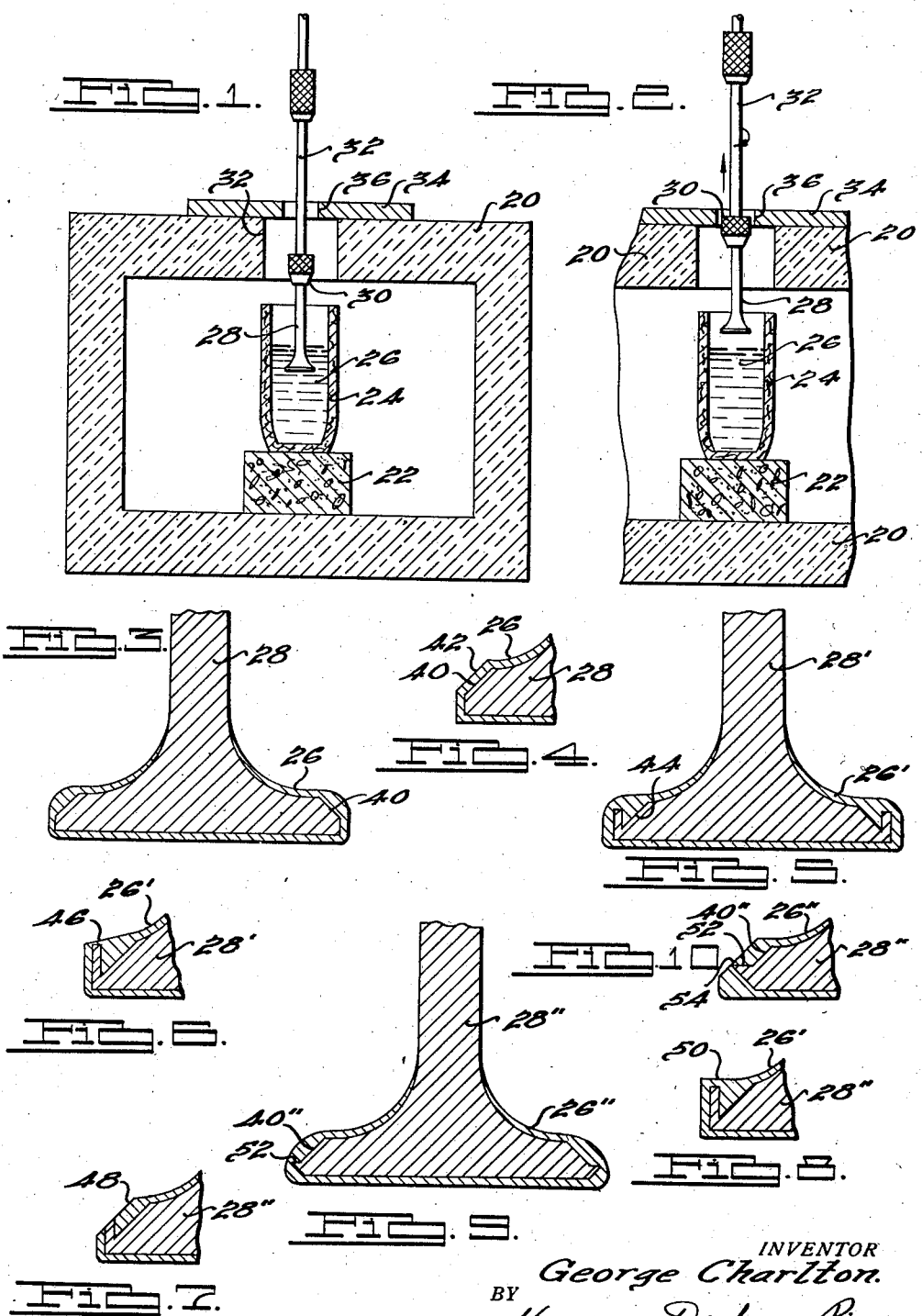

INVENTOR
George Charlton.
BY
Harness, Dickey & Pierce.
ATTORNEYS.

Patented Feb. 17, 1942

2,273,250

UNITED STATES PATENT OFFICE 2,273,250

METHOD OF MAKING VALVE PARTS OR THE LIKE

George Charlton, Battle Creek, Mich., assignor to Eaton Manufacturing Company, Cleveland, Ohio, a corporation of Ohio Application March 24, 1938, Serial No. 197,798

2 Claims. (Cl. 91—70.2)

This invention relates to valve parts for use in internal combustion engines and particularly to poppet valves and valve seats therefor and the present application is a continuation in part of my application for Letters Patent of the United States filed June 3, 1935, Serial No. 24,662, for improvements in composite valve and valve seat.

Objects of the invention include the provision of a valve having a main body portion including a head formed of a suitable material such as steel or a steel alloy and the head portion of which is provided with a covering or coating of a material highly resistant to the corrosive and/or erosive effects of exhaust gases, intimately bonded thereto over the area of juncture between the two; the provision of a poppet valve for an internal combustion engine in which the head and stem portions thereof are formed from a suitable material such as steel or a steel alloy and in which the head and at least a portion of the stem is provided with an enveloping covering of material thickness formed of a material highly resistant to the corrosive and/or erosive effect of exhaust gases and in which the opposed surface portions of the valve body and the covering are alloyed with each other to permanently bond the two together; and the provision of a valve of the type described in which the entire head portion of the valve is provided with a covering of material highly resistant to the corrosive and/or erosive effects of exhaust gases and which material is of greater thickness over the valve seating portion thereof than over the remaining portion of the valve.

Further objects of the invention include the provision of a method of forming a valve part comprising forming a main body portion of approximately the shape and contour desired in the finished article and applying a coating or covering of a material highly resistant to the erosive and/or corrosive effects of exhaust gases to certain areas thereof, the coating or covering being applied by immersing those portions or areas of the valve part which it is desired to coat in a molten mass of the covering material, and then withdrawing the valve part therefrom; the provision of a method of making a valve part as above described in which the valve part is spun during immersion in the molten covering material, and also after withdrawal from the bath of molten material whereby to throw off excessive amounts of the coating material and insuring an evenly distributed layer of coating material on the valve part; the method of making a valve part as above described in which the main body portion of the part is formed of steel or steel alloy and the coating material which is applied thereto has a melting point in excess of 2000° F.; the provision of a method of making a valve part as above described in which the melting point of the coating material is below that of the main body portion of the valve part but sufficiently close thereto that when the main body portion is immersed in the molten coating material and brought up to the temperature thereof a sweating of the surface of the main body portion will occur which is conducive to the alloying of the coating material to the material of the main body portion; the provision of a method of producing a valve part as above described in which the temperature of the coating material is maintained at such value and the part is permitted to remain in the molten bath of coating material for such length of time as to effect an incipient melting of the surface of the part whereby to effect an actual alloying of the material of the main body part and the coating material; the provision of a method of making a valve part as above described in which the valve part is pre-heated to a materially high temperature before immersion therein; the provision of a method of making a valve part as above described in which special precautions are taken against oxidization of the valve part prior to immersion in the molten bath of coating material; and the provision of a method of making a valve part as above described in which the valve part is brought up to a materially high temperature prior to immersion therein, by immersion in a molten bath of fluxing material.

The above being among the objects of the present invention the same consists in certain novel features of construction, combinations of parts and step or steps of operation to be hereinafter described with reference to the accompanying drawings, and then claimed, having the above and other objects in view.

In the accompanying drawings which illustrate suitable embodiments of the present invention and the various steps in carrying out the same, and in which like numerals refer to like parts throughout the several different views, Fig. 1 is a more or less diagrammatic vertical sectional view taken centrally through a suitable heating furnace in which is shown positioned a crucible filled with a molten material such as is desired as a coating for the valve part, together with a poppet valve suitably supported with the head portion thereof in immersed relation in the molten coating material;

Fig. 2 is a fragmentary view similar to Fig. 1 but illustrating the valve part as having been withdrawn from the molten bath of coating material and as being rotated to discharge excessive amounts of coating material therefrom;

Fig. 3 is an enlarged, fragmentary, sectional view taken axially through the head of a poppet valve coated in the manner illustrated in Figs. 1 and 2;

Fig. 4 is an enlarged, fragmentary, sectional view similar to that in Fig. 3 but illustrating an outer edge portion of the head of the valve only, illustrating the manner in which the valve head is machined to provide a valve seating surface thereon;

Fig. 5 is a view similar to Fig. 3, showing a modified form of valve construction;

Fig. 6 is a view corresponding to Fig. 4 but of the valve shown in Fig. 5 and illustrating one type of seating surface thereon.

Fig. 7 is a view corresponding to Fig. 6 and illustrating a different form of valve seating surface formed on the valve;

Fig. 8 is a view similar to Figs. 6 and 7 but illustrating machining of the coating material to provide a flat rather than a conical valve seating surface on the valve;

Figs. 9 and 10 are views corresponding to Figs. 3 and 4, showing another modified form of valve construction;

Figure 11:
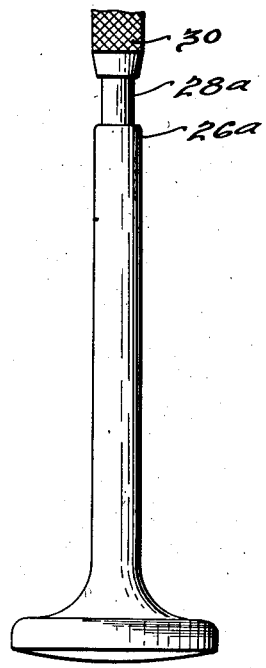
Fig. 11 is a side elevational view of a poppet valve in which both the head and stem portions of the valve have been coated in substantial accordance with the process disclosed in Figs. 1 and 2, and shown as still being secured in the supporting and rotating means disclosed in such figures.

It is well understood by those skilled in the art that the erosive and/or corrosive effects of exhaust gases in internal combustion engines foster early destruction of the valve parts thereof, the term "valve parts" is herein used to designate poppet valves and valve seat rings. The corrosive and erosive effects of the high temperature exhaust gases cause oxidizing, pitting, cracking and burning of these parts which fosters early destruction of the same and tends to render the seal between the valve and the valve seat inefficient for sealing purposes, thereby detracting from the desired performance of the engine. To overcome or at least reduce these effects on the valve parts it has heretofore been suggested that the valve and even the valve seat be plated with chromium or other corrosion resisting material. It is common practice to weld corrosion resisting alloys or metals to valves over that area thereof which is to form the valve seating surface, and to secure a ring in the engine cylinder block at the area thereof at which the valve seat is to be formed and to weld corrosion resisting material on that portion of the ring which is to form the valve seat. It is also conventional practice to form valves and valve seat rings in whole or in part of special alloys or materials which in and of themselves are highly resistant to the corrosive and/or erosive effects of the exhaust gases.

The plating of these valve parts by chromium or other metals has not been commercially practical for the reason that it is difficult to obtain the desired thickness of coating and the bond between the coating and the valve part is soon destroyed under the operating conditions met with in service, thus destroying the coating itself. The welding of the corrosion resisting materials to the valve parts results in a satisfactory construction but inasmuch as this material has in the past been successfully applied only by acetylene welding, the expense of thus forming a valve part is exceptionally high. Where the valve part is formed in its entirety from a material having sufficiently desired characteristics towards resisting the corrosion and erosion of the exhaust gases the cost of the part is still higher. Even when such material is welded to the valve part extreme care must be exercised in order to prevent the occurrence of blow holes and the like in the material which render the final product unsatisfactory for use. Because of the difficulties of applying such material to a valve by a welding process no attempts have been made in the past to coat a valve to any substantially greater extent than the valve seating surface thereof.

In accordance with the present invention the main body portion of the valve part, namely the poppet valve or the valve seat ring, may be made of any suitable material such as is conventionally employed in the production of these parts but does not need to have exceptional characteristics as respects resistance to corrosion and erosion of exhaust gases, thereby rendering such parts relatively economical to produce from a material cost standpoint. These parts and at least such areas thereof which it is desired to protect against the corrosive or erosive effects of the exhaust gases are provided with a coating or covering of special material or alloy having desired or exceptional characteristics of resistance to these erosive corrosive effects of the exhaust gases, and the present invention is particularly adaptable to provide such coating or covering over the entire valve part, where this appears to be necessary or desirable, in a simple, efficient and relatively economical manner. The process is particularly adaptable to the application of material by relatively thin coatings to the parts whereby to minimize the expense of the coating material itself. The coating material is applied, in accordance with the present invention, to the main body portion of the valve part in such a manner that an intimate bond, and even under some conditions an actual alloying between the coating material and the main body portion of the valve part, is obtained, which is unusually free of defects, and will maintain its usefulness over long periods of severe operations.

In order to illustrate the application of the present invention its application to the production of a poppet valve for an internal combustion engine will first be described, but it will be understood that it has applications to other valve parts such as valve rings which will be more specifically mentioned hereafter.

Referring to the drawings and particularly to Figs. 1 and 2, a furnace is illustrated at 20 and this may be of any suitable type and heated in any suitable manner but preferably so as to maintain a neutral or non-oxidizing atmosphere therein. Positioned centrally of the furnace and preferably upon a suitable block of refractory material such as 22 is a crucible or the like 24 which contains a mass of material 26 of the type which is desired as the coating or covering for the valve part. One material suitable for this use is that which is widely marketed primarily for use as high speed cutting tools under the name "Stellite," various grades of which are produced and the exact composition of which is known only to the makers but which embodies relatively large percentages of cobalt, chromium and tungsten and smaller amounts of carbon, silicon and possibly molybdenum but very little, if any, iron. This material is highly resistant to the corrosive effects of a great many elements and compounds and is particularly desirable in connection with the coatings provided in accordance with the present invention because of its high resistant qualities to the corrosive and/or erosive effects of high temperature exhaust gases in internal combustion engines and to certain compounds carried or formed thereby. The melting points of the various grades of Stellite range between 2300° F. and 2350° F.

Another alloy suitable for use as the material 26 is of approximately the following composition.

| | Per cent |
|---|---|
| Carbon | 0.76 |
| Manganese | 0.14 |
| Chromium | 9.04 |
| Silicon | 0.63 |
| Nickel | 33.17 |
| Boron | 1.87 |
| Balance | Principally iron |

The melting point of this alloy is approximately 2075° F. and has a hardness of approximately 35 Rockwell, C scale, and thus may be relatively easily machined by conventional methods.

Another alloy suitable for use as the material 26 as being resistant to the corrosive and erosive effects of hot exhaust gases is as follows, the percentages given being more or less approximate.

| | Per cent |
|---|---|
| Carbon | 0.38 |
| Silicon | 0.23 |
| Chromium | 14.53 |
| Tungsten | 18.08 |
| Boron | 3.5 |
| Balance | Principally iron |

The melting point of this alloy is approximately 2130° F. and inasmuch as it provides a hardness of approximately 63 Rockwell, C scale, it is extremely hard as well as resistant to corrosive and erosive effects of exhaust gases. Its harness is such that it will ordinarily require finishing by grinding processes.

When it is desired to employ a material 26 that is resistant to the corrosive and erosive effects of exhaust gases but is still soft enough to permit practical machining, an alloy similar to the second example given may be used as mentioned. The hardness of 35 Rockwell in the one case and 63 Rockwell in the other represents a wide range of hardness, from a machinable hardness to very hard unmachinable character. Between this hardness range suitable alloys of varying degrees of hardness, corrosion and erosion resistance to the effects of exhaust gases may be produced. The ability to produce such "steel" alloys which have a necessary lower melting point than the original melting point of steel lies principally in the use of the element boron. A high carbon and silicon content has the effect in lowering the melting point, but a pronounced lowering is effected by the use of boron. It will be understood that the above examples are given by way of illustration only and that the coating material 26 may be of any suitable or desirable composition having the desired characteristics for the coating of the valve parts and a melting point below that of the material from which the main body portion of the valve part is formed but still approaching such melting point.

In Figs. 1 to 4, inclusive, the valve part which is to be coated is a poppet valve, in its uncoated state is illustrated at 28, and forms the main body portion of the final product. In the constructions illustrated in Figs. 1 to 9, inclusive, it is assumed that only the head portion of the valve will receive a coating of the material 26 and, accordingly, this portion only of the main body portion 28 will be originally machined to the same shape and contour desired in the finished product but of slightly smaller dimension, the application of the coating material 26 thereto being relied upon to bring this portion of the valve up to the desired dimensions. As illustrated in Figs. 1 and 2, in applying the coating material 26 to the main body portion 28 the main body portion 28 is secured at its small or stem end in a suitable chuck or other securing device 30 carried by a raisable and lowerable shaft 32 provided with any suitable type of means (not shown) for supporting it, raising or lowering it and rotating it at will. In order to provide for entrance of the main body portion 28 through the walls of the furnace 20 and into the material 26 within the crucible 24, the upper wall of the furnace 20 is provided with an enlarged opening 32 therein which is overlain by a plate 34 having an opening 36 therein of sufficient size as to permit the main body portion 28 and chuck 30 to pass downwardly therethrough but small enough to prevent an excessive loss of heat from the furnace therethrough.

The main body portion 28 may be formed of any suitable material such as is conventionally employed in the manufacture of poppet valves for internal combustion engines. Where the valve is to be used as the exhaust valve and any portion of it is to be exposed to contact with the exhaust gases of an internal combustion engine or is to be subjected to the high temperatures of the exhaust gases, it is preferable to employ a type of steel that will withstand the same and in such case it may be desirable to employ an alloy generally known to the trade as "Silicrome X-142" having approximately the following analysis. This alloy has a melting point of approximately 2500° F.

| | Per cent |
|---|---|
| Carbon | .40 to .50 |
| Manganese | .70 maximum |
| Chromium | 13.00 to 15.00 |
| Nickel | 13.00 to 15.00 |
| Silicon | .30 to .80 |
| Tungsten | 1.75 to 3.00 |
| Phosphorus | .03 maximum |
| Sulphur | .03 |
| Iron | Remainder |

Another suitable alloy for use as the main body portion 28 of the valve is as follows, the percentages given being approximate.

| | Per cent |
|---|---|
| Carbon | 0.75 |
| Manganese | 0.50 |
| Chromium | 19.00 |
| Nickel | 1.75 |
| Silicon | 2.25 |
| Balance | Principally iron |

This alloy has a melting point of approximately 2600° F. The first of these alloys is known as an austenitic type of alloy and does not become hard upon heating and quenching. The last described alloy is known as a hardening type of alloy, that is it becomes hard upon heating and quenching. These two alloys are set out merely as illustrative of the various types of material that may be satisfactorily employed for the main body portion 28.

Other types of steel may be employed for the main body portion 28 particularly where the coating material 26 is to envelop all parts of the valve structure that are liable to be exposed to direct contact with the hot exhaust gases or be elevated to temperatures approaching the temperatures to which the head portion of the valve is subjected to in service. It may be generally stated, however, that in any case the melting point of the materials used for the main body portion 28 will usually be within the range of 2600° F. and 2700° F., always above 2500° F., and will usually be from 250° F. to 550° F. in excess of the melting point of the material forming the coating material 26.

In carrying out the present invention and considering the material 26 and main body portion 28 to be of the general composition stated, the furnace 20 is brought up in the heat until the material 26 has melted and has attained a temperature materially in excess of its melting point, for instance from 50° to 200° in excess of its melting point and preferably to a temperature within 150° to 250° of the melting point of the material of the main body portion 28. In the meantime the main body portion 28 (and in production, of course, the series of them) is heated preferably to a temperature between 1200° and 1500° F. This may be accomplished in any suitable manner as long as care is taken to prevent substantial oxidization of the surface of the portion 28. In other words it may be heated in a furnace having a neutral or reducing atmosphere or, if it is protected by a suitable flux, it may be heated in any suitable type of furnace. The preferred method in the heating of the main body portion 28 is to immerse it in a bath of molten flux of the high temperature type, such as borax or cryolite, maintained at such a temperature that the valve may be preheated to the desired temperature of 1200° F. during a suitable period of immersion therein. Where the main body part 28 is not coated or immersed in a flux during the preheating steps then it should be provided with a suitable flux coating prior to the steps illustrated in Figs. 1 and 2.

This preheating step is not essential in the broader aspects of the present invention in that it will be apparent that the main body portion 28 may be immersed when initially at room temperatures in the molten material 26 and by allowing it to remain immersed a sufficiently long time its temperature will be raised to the desired point, but this ordinarily will not be desirable from a commercial standpoint inasmuch as the time consumed to raise the temperature of the main body portion to that desired will be excessive and at the same time too much heat will be withdrawn from the molten material 26 to permit its proper control at a desired temperature level for continued production.

In accordance with the preferred method the main body 28 with a suitable flux thereon is removed from the preheating furnace when it has been raised to the desired temperature, the shaft 32 is raised so as to bring the chuck 30 at a sufficient height above the furnace 20 to permit the insertion and securement of the main body portion 28 therein, preferably the shaft 32 is caused to rotate and then the shaft 32 and main body portion 28 is lowered until that portion of the main body 28 which it is desired to coat is immersed in the molten material 26 within the crucible 24 in the furnace 20. The rotation of the valve in the molten bath causes the surface of the valve to be washed by the molten material, thereby insuring a better and more complete bond of the material to the valve body and a more even distribution of coating material thereon. The main body portion 28 is preferably allowed to remain immersed in the molten material 26 until the temperature of the immersed portion approaches or approximately equals the temperature of the molten bath, although it has been found that although the main body portion 28 is removed before the temperature of its immersed portions lack as much as 300° to 500° of the temperature of the bath a satisfactory bond between the material of the bath and the main body portion 28 will result. However, if the main body portion 28 is allowed to remain in the bath until the temperature of its immersed portions approaches the temperature of the bath itself it has been found that the surfaces of the immersed portion of the main body portion 28 will begin to sweat, which indicates incipient melting and is similar to that condition of a pair of iron or steel parts which are to be heated and then welded together by hammering or the like. It has been found that where the temperature of the immersed portions of the main body portion 28 are brought to such temperature then an actual alloying of the material 26 with the material of the main body portion 28 occurs, and thus provides a bond between them which will defy separation under most exacting conditions. The length of time which the main body portion 28 must be allowed to remain immersed in the molten material 26 in order to bring the main body portion 28 to the desired temperature will be determined in most cases by experimentation, but in any event as soon as the main body portion 28 has reached the desired temperature the shaft 32 will be raised as illustrated in Fig. 2, carrying with it the main body portion 28 and a surrounding coating of the material 26 from the bath, until the head portion of the main body portion 28 is positioned above the surface of the bath and preferably below the bottom of the crucible 24, and the shaft 32 will then preferably be rotated, or will continue to be rotated where it has been rotated in the bath, so as to cause excessive amounts of the material 26 to be thrown off from the valve under the effects of centrifugal force. The rotation of the main body portion 28 after removal from the bath not only causes excessive amounts of the material 26 lifted from the bath to be thrown off therefrom, but by controlling the speed of rotation of the main body portion 28 the thickness of the coating actually remaining on the main body portion 28 may be governed to a fairly accurate degree. Usually the rotational speed will be controlled so that the coating left on the main body portion, outside of the area desired as the seating surface or other area where a thicker coating is desirable, will ordinarily be somewhere between five one-thousandths (.005) and thirty one-thousandths (.030) of an inch in thickness. Ordinarily rotational speeds in excess of 100 R. P. M.'s will be imparted to the main body portion 28 under such circumstances. Furthermore the effects of the centrifugal force on the coating material 26 due to this rotation, particularly where the main body portion 28 is provided with an inclined face such as the face 40 illustrated in Fig. 3, will have a tendency to build up the thickness of the coating material on the peripheral surfaces of the head portion of the valve and particularly over the surface 40, as illustrated in Fig. 3, the added thickness at this point being preferable for the reason that it eventually will be formed to provide the valve seating surface of the valve and thus require added material at this point to permit re-dressing of the valve seating surface of the valve from time to time in service.

The rotation of the main body portion 28 and its coating of the material 26 after removal from the molten bath of material 26 is maintained until further discharge of material 26 from the main body portion ceases, and then the main body portion 28 and its coating 26 is raised with the shaft 32 to a position outside the furnace. Rotation of the parts is preferably continued, however, until the material 26 has solidified sufficiently to maintain its position and distribution of the main body portion 28, upon the occurrence of which the valve part 28 in its cooled condition may be removed from the chuck 30. It might be noted that the spinning operation referred to above after removal of the valve from the molten bath is preferably conducted while the head of the main body portion 28 is below the top of the crucible 24 so that the excess material thrown off therefrom will simply run back into the crucible and not be thrown to some location where its recovery might not be practicable. After the above described operations the valve will have assumed the condition illustrated in Fig. 3.

After the main body portion 28 and its coating 26 has been removed from the furnace 20 and permitted to cool to room temperature it is then ready to be machined to final form and which includes machining that portion of the coating 26 outwardly of the surface 40 to provide a valve seating surface 42 in accordance with conventional practice and as illustrated in Fig. 4.

From the above it will be understood that by the use of the present invention a coating highly resistant to the corrosive and erosive effects of exhaust gases may be applied to a valve part for an internal combustion engine in a simple, quick and economical manner, that the coating of material provided will be of material thickness (.005" to .030" except at the valve seating portion) but not of excessive thickness and that the coating will be bonded to the main body portion of the valve in such a manner as to obviate the possibility of separation therefrom under the severest conditions of service. Additionally because of the manner of applying the material 26 and the effects of the rotation thereon after the valve is withdrawn from the bath of molten material the occurrence of blow holes or other imperfections in the coating is entirely eliminated.

In practice the head of the main body portion 28 may be varied to obtain different thickness of deposit of the material 26 over the valve seating portion of the valve, to obtain this thickness for varying angularity of the valve seating portions thereof, or to obtain other desired characteristics thereof. For instance as an illustration reference may be had to Figs. 5 to 8, inclusive, in which parts corresponding to the parts previously described are indicated by the same numerals except that such numerals bear a prime mark. In these figures the peripheral portion of the enlarged head portion of the main body 28' is provided with an axially facing annular groove 44 in the axial face thereof directed towards the stem and adjacent the periphery of the head portion. The radially inner wall of the groove 44 is beveled inwardly toward the stem and the radially outer wall is cylindrical with its axis concentric with the axis of the main body portion 28'. With this construction when the main body portion 28 is immersed in the bath as illustrated in Fig. 1 and then withdrawn as illustrated in Fig. 2, the groove 44 serves as a cup and lifts a measured amount of the material 26 out of the bath with it, and where the spinning operation is properly conducted will serve to provide an added thickness of the material 26' over the grooved portion of the valve. This type of valve may be machined to form a valve seating surface such as the surface 46 illustrated in Fig. 6 extending at a relatively acute angle with respect to a plane perpendicular to the axis of the valve; it may be machined as illustrated in Fig. 7 to provide a valve seating surface 48 of an angularity equivalent to that provided in the valve first described and shown in Fig. 4; or it may be machined to provide a flat radially disposed valve seating surface such as the surface 50 illustrated in Fig. 8.

On the other hand if the main body portion is formed as illustrated in Figs. 9 and 10 so as to provide a radially projecting lip such as 52 at the outer edge of the angular surface 40'', it has been found that an added thickness of the material 26'' will build up over the surface 40'' to thereby provide a thicker layer of the material 26' for the valve seating surface of the valve. After machining the valve seating surface may appear as indicated at 54 in Fig. 10.

Ordinarily it will be sufficient if the head portion only of the valve is provided with a coating 26 as illustrated in Figs. 1 to 10, inclusive, as in most cases it is the valve head and valve seating surface that is affected to the greatest extent by the corrosive and erosive effects of exhaust gases. However, where high duty internal combustion engines, such as those employed in airplanes, employ fuels that are doped with certain anti-knocking compounds, such as ethyl compounds, certain products of combustion are formed which find their way along the valve stem and between the valve stem and its guide and which compounds are extremely corrosive and attack the surface of the valve stem within the guide, resulting in pitting of the stem within the guide. In such case the practices of the present invention make it feasible to coat either the entire stem portion of the valve or at least that portion thereof which is to work in the valve guide, whereas by the practices heretofore employed in the application of special corrosion resisting alloys to the surfaces of valves no such construction has heretofore been suggested.

Figure 12:
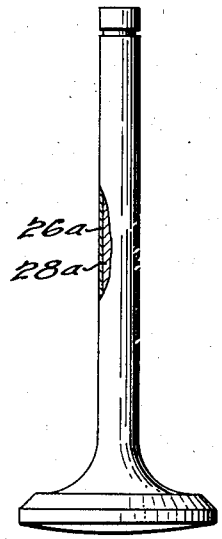
Fig. 12 is a view of the valve shown in Fig. 11 after it has been machined to final form.

In following out this phase of the present invention the same general procedure may be followed as previously explained except that in this case, as illustrated in Figs. 11 and 12, the main body portion of the valve here illustrated at 28a is initially produced of a shape and contour and also of a size, except for the length of the valve stem portion, less than that desired in the final product, and so that after the coating 26a has been applied thereto the dimensions will be such that those parts of the valve requiring finished machining may be machined to bring the valve to the desired size, shape and contour desired in the final product. The stem portion of the main body portion 28a in this case is made longer than that desired in the final product and its end portion is gripped in the chuck 30 previously described. After the initial or preliminary heating operation the main body portion 28a is inserted in the chuck 30, is rotated and lowered into the bath of molten material 26a to a distance sufficient to cover the desired length of stem on the valve, it is allowed to remain in the bath the desired length of time, and is then removed from the bath and spun as explained. After the coating material 26a has solidified and the valve cooled to room temperature it may then be brought to finished condition as illustrated in Fig. 12 by removing the uncoated end portion of the stem and machining the exterior surfaces as illustrated in Fig. 12. The resulting product, except for the extreme end of the valve stem which is never subjected to the effects of the exhaust gases or their high temperatures in any case, is completely surrounded by a coating of the material 26a, the main body portion 28a serving as a core only, and resulting in a valve which will be highly resistant to all of the corrosive and erosive effects of the exhaust gases and their products met with in present day engine constructions.

Figure 13:
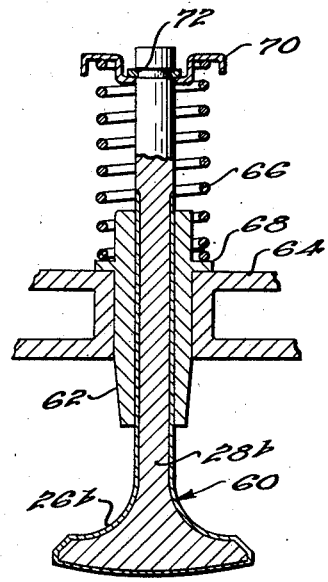
Fig. 13 is a sectional view taken axially through a poppet valve and cooperating parts of an internal combustion engine, illustrating the application of a coating in accordance with the present invention to those parts of the valve which are directly exposed to the exhaust gases in the engine and also enclosed by the valve stem guide.

In Fig. 13 a poppet valve for an internal combustion engine is illustrated generally at 60 and as being guided in a conventional manner in a conventional valve guide 62 supported by a portion of the cylinder block 64 of an internal combustion engine in a conventional manner. The usual valve spring 66 is shown as surrounding that end of the valve stem projected through the guide 62 on the opposite side from the head of the valve and as being held under compression between the flange 68 of the valve guide and a conventional type of washer 70 maintained on the end portion of the valve stem by means of conventional locking members 72. The major portion of the stem of the valve projecting outwardly from the guide 62 at the end of the guide opposite the head of the valve is usually located in a chamber constantly exposed to the interior of the crankcase of the engine, and consequently is not exposed to the effects of the exhaust gases and does not require a coating of material resistant to the corrosive effects of the exhaust gases or its by-products. Accordingly, full protection of the valve 60 from the corrosive or erosive effects of the exhaust gases and of the corrosive by-products thereof may be obtained in the manner illustrated in Fig. 13 without fully coating the valve. As illustrated in that figure the main body portion 28b and particularly the stem portion thereof is made of a smaller size than that desired in the final product only to the extent of its surface which will be exposed to the exhaust gases during operation or which will normally be confined within the valve guide 62, the remaining portion of the stem portion being of a diameter or slightly larger diameter than that required in the final product. The coating 26b corresponding to the various coatings 26 heretofore described is then applied in the general manner described to that portion only of the valve to which the coating 26b is desired, the final product being such as disclosed in Fig. 13 in which the coating 26b envelops the head of the valve 60 and that portion of the stem thereof exposed to the exhaust gases during operation or confined within the valve guide 62.

Figure 14:
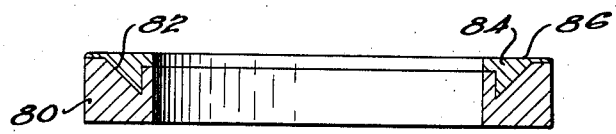
Fig. 14 is a vertical sectional view taken axially through a valve seat ring which has been formed in accordance with the present invention and before the same has been machined to provide a valve seating surface thereon.
Figure 15:
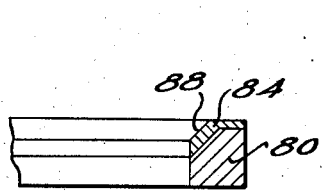
Figs. 15 and 16 are fragmentary sectional views of the valve seat ring shown in Fig. 13 after it has been machined to form a valve seating surface, and illustrating machining of the same to form two different types of valve seating surfaces.
Figure 16:
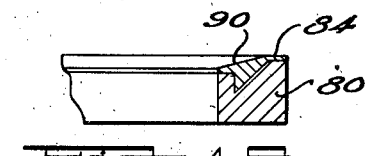

In Figs. 14, 15 and 16 valve seat rings are disclosed which are provided with valve seating surfaces coated with a material in accordance with the present invention. As is well understood it is common practice to resort to separately formed valve seat rings for insertion in the cast iron or other cylinder blocks of internal combustion engines so as to obtain a valve seat of superior wearing qualities and one that will not be as readily affected by the corrosive and/or erosive effects of the exhaust gases as the material of the block itself. The ring shown in Fig. 14 may be employed in connection with a valve having a flat radially directed seating surface, or it may be machined to provide seats of modified form as illustrated in Figs. 15 and 16.

The valve seat ring illustrated in Fig. 14 comprises a ring 80 formed of a material which may be the same or substantially the same as the material heretofore described for the main body portion 28 of the poppet valves above described. The upper surface of the main body portion 80 is provided with an annular upwardly opening groove 82 therein and this groove 82 is filled with, and the corresponding end surfaces of the ring 80 overlain with a layer of, material 84 which may be the same or substantially the same as the material 26 previously described. As in the construction illustrated in Figs. 5, 6 and 7 the groove 82 serves the same function as the groove 44 previously described in that when the ring 80 is dipped into the bath of molten material and withdrawn the groove 82 will serve as a cup and lift an added amount of the coating material out of the bath with it. The ring 80 will, of course, but depending upon the method of support while immersing it in the bath of molten coating material, usually be removed from the bath with a complete coating of the material 84 which may be removed therefrom on all surfaces except that where the valve seat is to be formed, as illustrated in Fig. 14, or portions of it may be allowed to remain on other surfaces of the ring although no particularly useful function will be served thereby.

Instead of providing a flat or radially directed valve seat surface such as the surface 86 in the construction illustrated in Fig. 14, the same may be further machined to provide angularly disposed seating surface 88 of approximately 45° inclination as illustrated in Fig. 15, or it may be machined as illustrated in Fig. 16 to provide a valve seating surface 90 of a substantially less inclination, the construction in general being generally applicable to relatively wide modifications of shape and arrangements of seats and rings as will be apparent to those skilled in the art. In any event regardless of the shape or disposition of the ring and seat the coating material for such valve seat rings will be adhered to the main body portions thereof with the same desirable bonding characteristics as described in connection with the previously described poppet valve.

Formal changes may be made in the specific embodiments of the invention described without departing from the spirit or substance of the broad invention, the scope of which is commensurate with the appended claims.

What I claim is:

1. In the manufacture of a ferrous article subjected to the effects of a corrosive element in service, the steps of forming a main body portion of a steel having a melting point in excess of 2500° F., providing a molten bath of a metallic alloy having properties of a greater resistance to the corrosive effects of said element than the material of said main body portion, bringing the temperature of said molten bath to and maintaining the temperature of said molten bath at a value of between 150° to 250° F. less than the melting point of the material of said main body portion, immersing at least a portion of said main body portion in said molten bath and maintaining it in said immersed condition until the immersed portion thereof attains a temperature approximating the temperature of said bath whereby to effect a bonding of said molten material to said immersed portion, and then removing said main body portion and a coating of said material thereon from said bath while said bath is still in molten condition and allowing it to cool.

2. A coating process comprising, in combination, the steps of; forming a body portion of a steel having a melting point in excess of 2500° F., providing a molten bath of a metallic alloy having properties of a greater resistance to the corrosive effects of exhaust gases of internal combustion engines than the material from which said body portion is formed, maintaining said molten bath at such temperature as to be enabled to effect, and immersing at least a portion of said body portion in said bath for a sufficient length of time to initiate, incipient melting of the surface of said immersed portion, then withdrawing said body portion and a coating of said material thereon from said bath, subjecting the assembly of said body portion and said coating thereon to a whirling action whereby to discharge at least a portion of said molten coating therefrom under the effects of centrifugal force and maintaining said spinning until said assembly has cooled sufficiently to effect solidification of said coating thereon.

GEORGE CHARLTON.